United States Patent [19]

Hughes

[11] Patent Number: 5,013,151
[45] Date of Patent: May 7, 1991

[54] VARIABLE BEAM WIDTH LASER RADAR SYSTEM

[75] Inventor: John L. Hughes, Canberra, Australia
[73] Assignee: Australian Electro Optics Pty Ltd., Australia
[21] Appl. No.: 327,863
[22] Filed: Dec. 7, 1981

[30] Foreign Application Priority Data

Dec. 9, 1980 [AU] Australia .............................. PE6837

[51] Int. Cl.⁵ .......................... G01B 11/26; B64D 1/04
[52] U.S. Cl. ..................................... 356/152; 89/1.11; 350/96.24; 356/5; 372/6
[58] Field of Search ...................... 356/5, 152; 89/1 A, 89/1.11; 372/6; 350/96.24

[56] References Cited

U.S. PATENT DOCUMENTS

| | | | |
|---|---|---|---|
| 3,331,651 | 7/1967 | Sterzer | 350/96.29 |
| 3,427,611 | 2/1969 | Enenstein | 372/72 |
| 3,590,248 | 6/1971 | Chatterton | 350/96.15 |
| 3,691,390 | 9/1972 | Chow et al. | 250/553 |
| 3,691,483 | 9/1972 | Klein | 372/44 |
| 3,727,233 | 4/1973 | O'Meara | 455/603 |
| 3,878,520 | 4/1975 | Wright et al. | 350/393 |
| 3,946,233 | 3/1976 | Erben et al. | 89/1 A |
| 3,953,131 | 4/1976 | Britz | 356/152 |
| 3,967,899 | 7/1976 | O'Meara | 356/152 |

OTHER PUBLICATIONS

Pearson, Optical Engineering, vol. 15, No. 2, Mar.-Apr. 1976, p. 151.

Primary Examiner—Stephen C. Buczinski
Attorney, Agent, or Firm—Townsend and Townsend

[57] ABSTRACT

A high precision, high power laser-radar system whose output beamwidth can be varied from a divergent to a convergent mode thus allowing for target acquisition, its high precision tracking and ultimately its destruction is described. Essentially the invention comprises an optical detector and an optical transmitter consisting of a steerable, large diameter, coherently packed, single mode optical fibre bundle, one end of which is compacted and optically polished to act as the transmitting aperture of the said laser-radar system while the other end of the said fibre bundle is unbound, with each individual fibre, or a small group of such fibres being optically coupled to one of many laser pulse amplifiers forming a large array of such amplifiers required to produce the transmitted laser output pulse energy.

10 Claims, 3 Drawing Sheets

VARIABLE BEAM WIDTH LASER RADAR SYSTEM

FIELD OF THE INVENTION

This invention relates to a high precision, high power laser-radar system whose output beamwidth can be varied from a divergent to a convergent mode thus allowing for target acquisition, its high precision tracking and ultimately its destruction.

DESCRIPTION OF THE PRIOR ART

Prior art laser based systems for tracking and destroying targets are built specifically for one or other of these tasks but not both. In pulsed laser based weapons systems the problem is to generate a sufficiently high peak power to rapidly destroy the target under operational conditions. To date, pulsed laser systems have generally been used in the tracking mode. On the other hand, in continuous wave laser weapons systems the problem is the use of such powerful beams for passive target tracking purposes, particularly just prior to the target destruct phase where a detailed knowledge of target parameters becomes critical. In general continuous wave lasers are used for target destruction.

The present invention differs from prior art systems in that it can firstly acquire the target via a scan search, it can then track the target with high precision and finally it can destroy the said target using the convergent beam mode. My invention can operate in either a pulsed or continuous wave mode.

BACKGROUND OF THE INVENTION

Soon after the advent of the laser in 1960, its suitability was tested as a transmitter for optical radar systems. However, it was not until the advent of Q-switching in 1962 that single pulse outputs became available. During the period 1963-1964, the inventor was responsible for one of the first systematic field trials ever undertaken to assess the potential of laser-radar. These field trials were carried out by the Royal Radar Establishment, Malvern, U.K., on the army proof range in Lark Hill, Salisbury Plains and the results of the trials have been published in Royal Radar Establishment Technical Memorandum, July 1966. During these early field trials of laser radar it became clear that whilst the inherently narrow beamwidth of laser-radar had unique advantages in that relatively small targets such as distant, low flying aircraft filled the beam, leading to high transmitted energy utilization, it also became clear that such narrow beamwidths made it virtually impossible to acquire the target unless one had an accurate estimate of its coordinates via either a wide angle optical telescope or a conventional radar if one utilized prior art acquisition techniques.

On the other hand, if one utilized sophisticated laser based techniques the acquisition problem could be approached in two ways. Firstly, the laser beam could be scanned so that the scan pattern would cover a relatively large area compared with the unscanned beam. Secondly, the laser beam could be diverged The problem with the first approach was the fact that no technique existed whereby a laser beam of appropriate power could be scanned at the required rate. The problem with the second approach was the fact that no technique existed to boost the energy per unit area of the beam as it was diverged It was also realised during these early field trials that once a laser-radar had locked onto a given target, the said target could be destroyed by converging the beam. Since the destruction of the target would be carried out by the laser beam being utilized for the high precision tracking of the said target, its destruction would be fully optimised.

It was concluded that the best approach to the realisation of a practical configuration of a diverging-converging beam laser-radar system would be via the use of optical fibres. It was proposed that one end of the optical fibres should be attached to a flexible, transparent membrane several meters in diameter which would act as the surface of the optical transmitter, the remainder of which took the form of an enclosure which could be evacuated or pressurized as required. In the former case the light from the transmitter would converge and be focussed at a distance related to the radius of the concave surface. To diverge the beam the enclosure would have to be pressurized so that the membrane took the form of a convex surface. Laboratory tests were undertaken at the Royal Radar Establishment in 1964 to assess the feasibility of the concept. Unfortunately, the very first experiment, namely the study of helium-neon laser beam propagation along an optical fibre bundle showed that the output diverged by 30° compared with the 0.1° divergence of the input beam. It was clear that single-mode optical fibres would be required in a coherently packed bundle.

Studies carried out in Australia since that time have led to a solution to the problem. The present invention is based on the said solution. It was realised that the problem of realising a variable beam width laser-radar system depended on the optically polished output face of a coherently packed optical fibre bundle behaving as a phased array of optical transmitters. Such phased array transmitters of electromagnetic energy are well known in the microwave region of the electromagnetic spectrum where the wavelength of the transmitted radiation is about one centimeter or about ten thousand times longer than laser wavelengths. To achieve a phased array of optical fibre transmitters across the optically polished output face of a coherently packed optical fibre bundle it is necessary to delay the emergence of light from some fibre ends relative to others and to do this in a systematic way across the whole of the output aperture of the laser-radar transmitter. Techniques to achieve phased array optical scanning using an appropriately excited bundle of optical fibres have been described in a co-pending Australian patent application (No. PD 7059 lodged 8 Dec. 1978 (inventors J. L. Hughes and A. K. Ghatak)) and have also been outlined in "Applied Optics" July 1st, 1979.

SUMMARY OF THE INVENTION

However, the techniques required to focus a high power laser beam utilizing an optical fibre bundle have only been revealed in this patent application, the fundamental difference being in the use of concentric rings of single mode optical fibres rather than parallel rows of said fibres. By appropriate computer controlled manipulation of the laser beam amplifiers within an array of such amplifiers, it is possible to combine phased array scanning with phased array focussing of intense laser beams, thus providing a variable beam laser radar system with a target destruction capability.

The invention consists of an optical detector and of an optical transmitter consisting of a steerable, large diameter, coherently packed, single mode optical fibre bundle, one end of which is compacted and optically polished to act as the transmitting aperture of the said laser-radar system whilst the other end of the said fibre bundle is unbound, with each individual fibre, or a small group of such fibres being optically coupled to one of the many laser pulse amplifiers forming a large array of such amplifiers required to produce the laser output pulse energy transmitted by the invention. Each of the said laser pulse amplifiers is connected electrically to a power supply and electronic control unit, the firing sequence for the said array of laser pulse amplifiers being computer controlled, the input signals to the said computer module being supplied via the steerable optical detector system slaved to the said optical transmitter module. Each of the said laser pulse amplifiers is connected optically to a maser laser oscillator which provides the coherent laser pulse to activate this invention.

It is an object of the present invention to provide a single system for the acquisition of a target, its high precision tracking and ultimately its destruction.

Another object of the invention is to couple the output of a large number of powerful laser pulse amplifiers, triggered by a single oscillator, into a single ultra high power laser beam whose peak output power can exceed $10^{15}$ watts.

A further object of the invention is to provide the phased array scanning of a powerful laser beam.

A still further object of the invention is to combine phased array optical scanning with the mechanical movement of the transmitter to allow for continuous tracking in both azimuth and elevation.

A still further object of the invention is to achieve phased array focussing of a powerful laser beam.

Another object of the invention is to provide a variable focussed output beam.

Yet another object of the invention is to allow for the high precision tracking of a target via a portion of the transmitted laser light reflected, and/or scattered, off the said target which is detected and processed within the invention.

Still another object of the invention is to acquire, track and destroy multiple targets.

The invention allows an uncooperative target, or a multiplicity of such targets, to be detected via either a scanned pattern traced out by a diverged transmitted laser beam or by a single, diverged transmitted laser beam. The invention then allows for the high precision tracking of the acquired target, or multiplicity of such targets, by concentrating the scanning pattern on said target, or targets, prior to beam convergence which can destroy said target or targets. Hence in one aspect the invention comprises a coherently packed bundle of single mode optical fibres with one end compacted into a diameter of between about 20 centimeters and about 20 meters, the said end being optically polished to about $\lambda/10$ where $\lambda$ is the laser wavelength. The other end of the optical fibres are loosely bound and are connected, either individually, or in small groups, to a laser beam amplifier such as a semiconductor laser, said amplifier being a member of a large array of the laser beam amplifiers all of which are optically coupled to a master laser oscillator. Alternatively, the optical fibres themselves, appropriately excited may act as laser beam amplifiers, particularly when travelling wave excitation techniques are utilized.

Each laser beam amplifier forming the array of said amplifiers is connected to its own power supply and timing module, with the sequential firing of the whole array of laser beam amplifiers being controlled via a computer module.

Signals reflected, or scattered, off the target are detected via the optical detector module, analysed by the computer module which commands and oversees the sequential firing of the laser beam amplifiers to phase-lock the fibre array in the output face of the fibre bundle so that the output beam can be set into a scanning pattern and focussed at the appropriate distance on target as required. To track and destroy multiple targets the above process has to be repeated for each target in turn.

If the target has not been destroyed as it flies over the site of the invention, the transmitter can be mechanically adjusted to allow overhead tracking of the target and its subsequent destruction. Alternatively the output aperture of the transmitter can be fixed in a horizontal plane.

The invention can be particularly effective in acquiring, tracking and destroying low flying targets such as cruise missiles. The optical scan pattern is initially spread out over the horizon, with conventional radar as known in the art providing an auxiliary search capability, particularly higher up above the horizon where the relatively wide beam widths do not cause problems arising from ground clutter effects. Once the approaching, low flying target is picked up, the computerized scan pattern concentrates on that particular region whilst still providing a general scan for multiple target approach. Immediately the target is within range, the laser beam is converged to increase the radiation flux density on target by up to one trillion times during the destruct phase. By the destruct phase is implied the process of deactivating the target as a potential threat in whatever way possible, including its total destruction.

BRIEF DESCRIPTION OF THE SEVERAL VIEWS OF THE DRAWINGS

A better understanding of the invention will be gained from the following description taken in conjunction with the accompanying drawings. It is emphasised that the ensuing teachings are exemplary and not limitative of the scope and applicability of the invention.

In the drawings.

DETAILED DESCRIPTION

Figure 1:
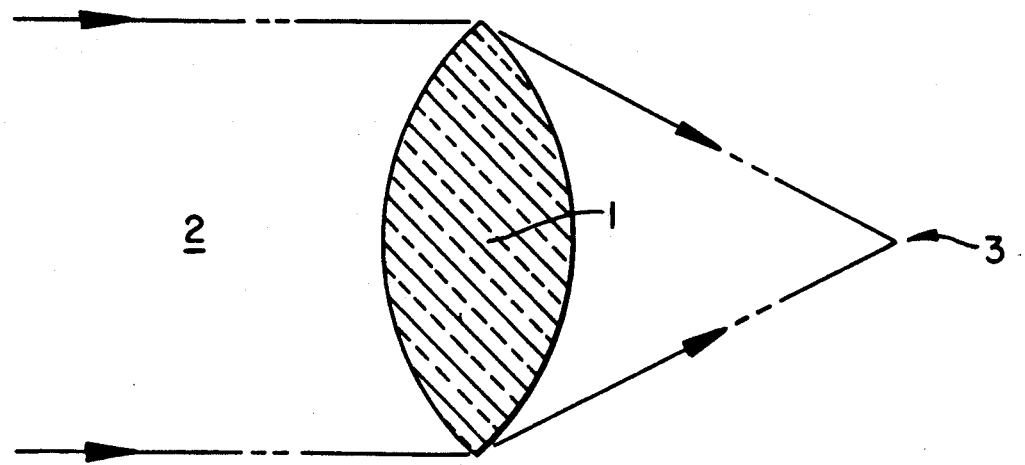
FIG. 1 is a schematic layout of a simple lens showing the processes involved in focussing a laser beam.

Now having particular regard to the numerals on the drawings, numeral 1 indicates a convex lens, numeral 2 a laser beam generated by means well known in the art and numeral 3 the focal region of the said lens.

Numeral 4 indicates a coherently bound, single mode, optical fibre bundle with the longest optical fibre being positioned along the central axis of the bundle and with the shortest length fibres being positioned along the outside surface of the said bundle. Numeral 5 indicates a single mode laser output beam generated in laser beam generator indicated by numeral 6.

Numeral 7 indicates the optically polished end face of the optical fibre bundle, with each optical fibre end behaving as one optical transmitter in a phased array of such transmitters.

Numeral 4' indicates a single mode, optical fibre.

Numeral 8 indicates an optical fibre bundle made up of single mode fibres all of equal length, one end of which is coherently packed and optically polished, indicated by numeral 7, whilst the other end is loosely bound with each fibre, or a small group of fibres, being connected to a laser pulse generator, one of a large array of said generators, indicated by numeral 9 and powered by a power supply indicated by numeral 10 which in turn is controlled by timing module indicated by numeral 11, the firing sequence of the whole array being controlled by a computer system 112 indicated via connector numeral 12. Numeral 13 indicates the laser trigger pulse from the master oscillator 113.

Numeral 14 indicates the output laser beam deflected to one side of the central axis of the bundle 8 whilst numeral 15 indicates the output beam deflected in the opposite direction. The maximum deflector angle $\theta$ is given by $\theta = (\lambda)/(2D)$ radians where $\lambda$ is the laser wavelengths and D is the fibre diameter. Taking $D = 3 \times 10^{-4}$ cms for a single mode fibre and $\lambda = 10^{-4}$ cms, we obtain $\theta = (\lambda)/(2D) = 1/6$ radians or 11°. Numeral 16 indicates a variably focussed output beam.

As shown in FIG. 1, the laser beam 2 is focussed by the convex lens 1 to a focus spot 3 by refraction within 1 due to the velocity of light being less within the lens medium than outside.

Figure 2:
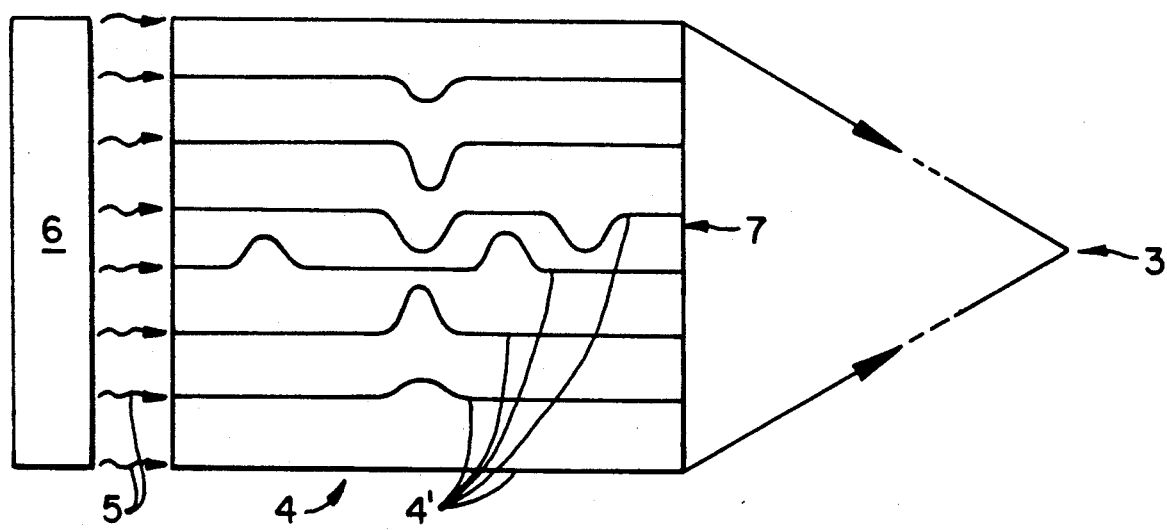
FIG. 2 is a schematic layout of a bundle of optical fibres, the fibre along the central axis being the longest in length whilst those fibres around the outside perimeter are the shortest in length.
Figure 3:
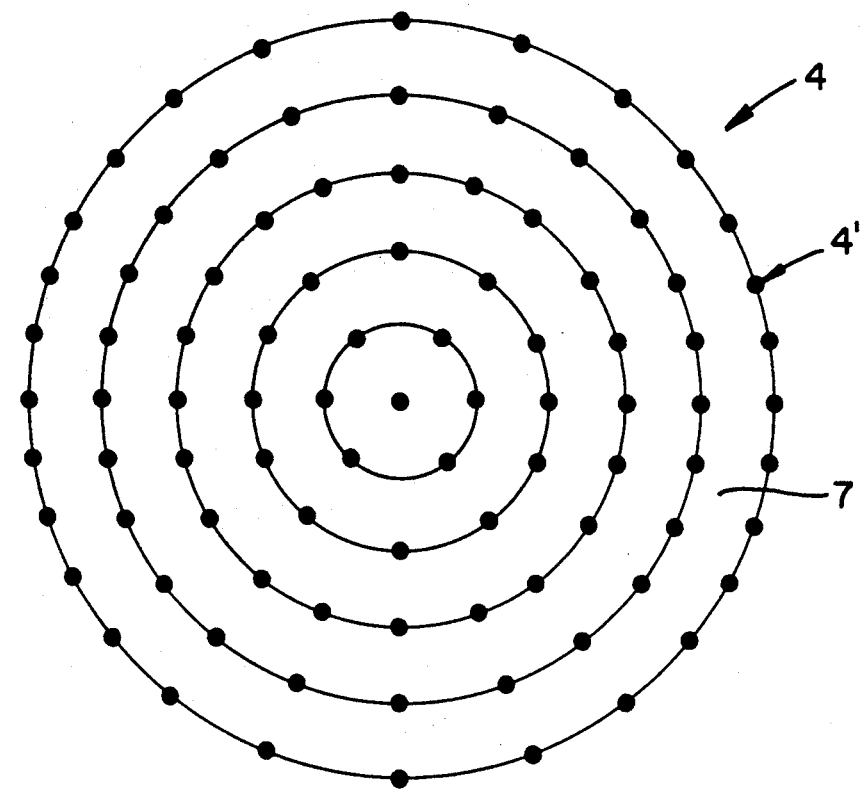
FIG. 3 is a schematic layout of concentric phased arrays of optical fibres forming the optically polished end face of an optical fibre bundle lens.

Shown in FIG. 2 is the optical fibre bundle 4 equivalent of lens 1. The optical fibres 4' in bundle 4 are arranged in concentric layers as shown in FIG. 3, the fibre positioned along the central axis of the said bundle being of longer length than any of the other fibres 4' within the said bundle, each concentric layer containing fibres of equal length but differing from the lengths of the fibres making up the other concentric layers in a manner that progressively decreases from the centre to the outermost layer of fibres in the bundle 4. Thus, when the laser beam generator 6 is fired to emit laser beam 5 into the bundle 4, the portion of beam 5 that traverses the central fibre takes the longest time to emerge from the bundle which that portion of 5 that traverses the shortest fibres in the bundle, namely, the outside layer, will take the least time and, therefore, emerge the first from optically polished end-face 7. It follows that the phased array of optical transmitters represented by concentric rings of optical fibre ends will couple together to focus the output beam across face 7 into focus spot 3. The focal length of the bundle lens, that is the distance from face 7 to focus spot 3 depends on the optical path difference presented by the fibre on the central axis and those in the outermost layer of the bundle 4.

State of the art techniques to assemble coherently packed, single-mode optical fibre bundles have benefited considerably from the use of such fibre bundles in medical, oscilloscope and communications applications. Bundle diameters up to 0.5 cms are common in medical applications whilst optical-fibre bundles in the form of plates with diameters of 5 cms or more are utilized on oscilloscopes and high speed electronic cameras. In the optical communications field, optical fibre bundles up to five kilometers long are utilized. In the present invention, output face 7 diameters up to 20 meters or more are applicable with fibre lengths of several meters to several tens of meters, the input end of the bundle 4 being loosely bound. The diameter of individual fibres 4' can range from a few microns, 1 to $5 \times 10^{-4}$ cms, to over 20 microns.

Laser source 6 is a single pulse generator capable of emitting a high quality laser pulse 5 which can be coupled into the optical fibre bundle 4 via techniques well known in the art.

Figure 4:
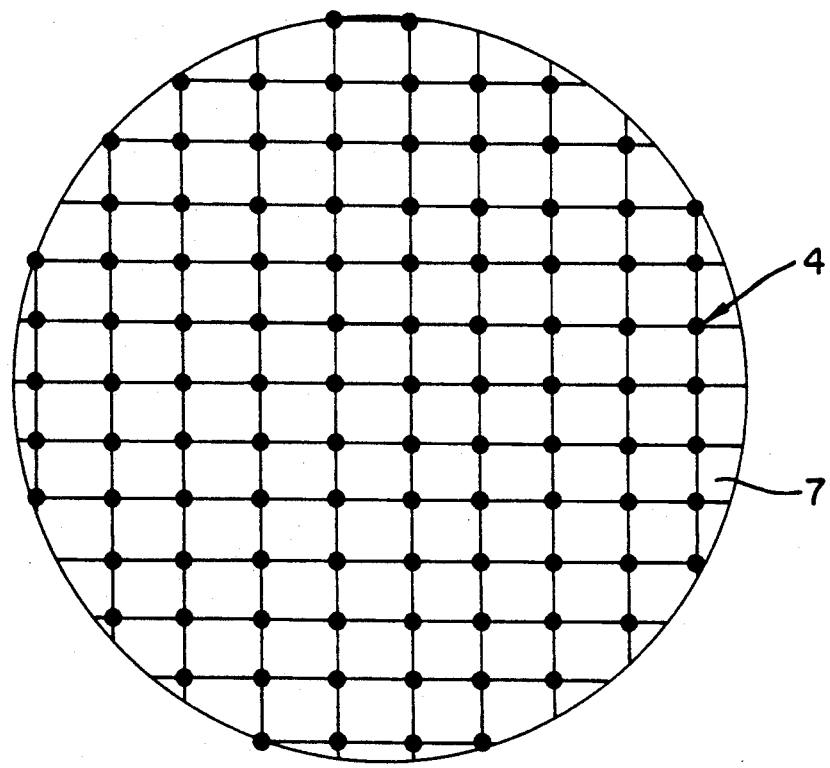
FIG. 4 is a schematic layout of a phased array of optical fibres forming the optically polished end face of an optical fibre bundle laser beam scanner.

FIG. 4 shows a schematic layout of the optically polished end face 7 of an optical fibre bundle with the rows being considered as vertical and horizontal rather than concentric as was the case in FIG. 3. The behaviour of such phased arrayed rows of optical transmitters has been described in the co-pending patent application referred to earlier.

Figure 5:
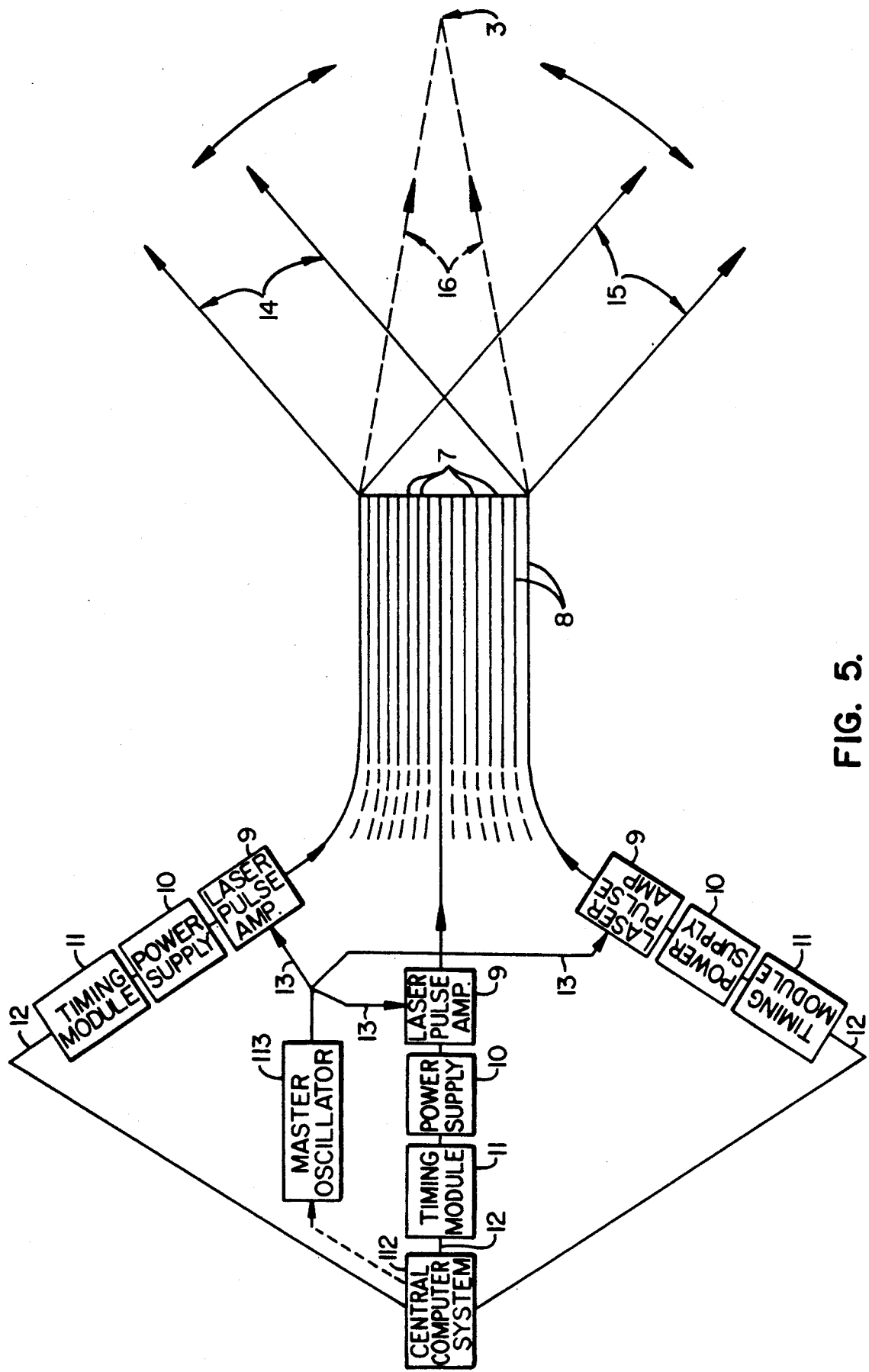
FIG. 5 is a schematic layout of a preferred system for generating a variable beamwidth laser radar beam showing an array of laser pulse generators coupled via optical fibres of equal length to an output aperture which consists of a phased array of optical fibre ends, their emission pattern being determined by a computer controlled firing sequence of the laser beam generators.

FIG. 5 shows a schematic layout of a preferred form of the present invention consisting of optical fibre bundle 8, compacted in a coherent manner into optically polished end face 7 the other end of the said bundle 8 being loosely bound with all of the equal length fibres, or small groups of them being connected to their own laser pulse amplifier 9, which is part of a large array of such laser pulse amplifiers all of which are optically coupled to a master laser oscillator. Each laser pulse amplifier 9 is connected to its own power supply 10 which in turn is controlled by its own timing module 11 which controls the firing of laser pulse amplifier 9. The firing of the whole array of units 9, 10 and 11 is controlled by a computer system 112 connected to the said array via connector 12. This same computer system 112 also controls the operation of master oscillator 113.

The central computer system 112 connected to the laser pulse amplifier 9 array via power supply 10 array, and timing module 11 array via connectors 12, determines the firing sequence of said laser beam amplifiers so that the optical output via optically polished end face 7 is either in the form of the focussing pattern shown in FIG. 3 or beam scanning pattern shown in FIG. 4 or in any combination of both of these patterns.

With the laser beam amplifier 9 array set to fire in the scanning pattern (FIG. 4) by the central computer system 112, the divergent output beam 14 can be scanned to position 15 and back to position 14 continuously. The computer can arrange for this scan pattern in any orientation relative to end face 7. The computer system 112 can also set the firing pattern to conform to FIG. 3 thus leading to the focussing of the output beam into focus spot 3. However, by adjusting the firing sequence for the concentric pattern output, the focal length of end face 7 can be varied.

Time delays required to set up the conditions for phased array scanning across the output aperture 7 are relatively short, that is in the pico-second $10^{-12}$ seconds regime. Excessive, and possibly unattainable demands would be made on any computer system to switch millions of semiconductor laser amplifiers on an individual basis on the required picosecond time scale. The best technique within current state of the art to computer control this invention is to utilize the technique of pattern switching. Since the velocity of light, or electromagnetic waves in general, has to be considered as a fundamental constant of nature whose value is given by 2.99 ... $\times 10^{10}$ cm per second in a vacuum, a relatively large change in the length of a propagating medium will result in minute differences in time. For example two optical fibres differing in length by 3 mm will lead to a $10^{-12}$ second difference in laser pulse propogation time. Applied to computer controlled pattern switching an electrical pulse generated in a source is divided into seven equal portions in a junction and directed to switch laser amplifiers whose switch on-line can be adjusted so that one laser amplifier is switched one picosecond before a first pair of laser amplifiers, which in turn are switched a picosecond ahead of a second pair of laser amplifiers which in turn are switched a picosecond ahead of a third pair of laser amplifiers. All the computer has to do is to select the appropriate switching pattern and route the signals accordingly. Since the period between the angular beam spacings would be at least one microsecond ($1 \times 10^{-6}$ seconds) the computer has plenty of time to select the correct pattern switching sequence. In this way a relatively slow response computer can activate the extremely fast laser amplifier switching sequences required for optical phased array scanning.

A particular use of the present invention is as a defensive weapon against low flying aircraft and cruise missiles which fly below the effective coverage provided by conventional radar systems, particularly over uneven terrain.

When the attacker is picked up by an optical detector acting in conjunction with the invention transmitting a diverged beam scanning pattern in the search mode, possibly in conjunction with conventional radar, the pick up area of the scan pattern is intensified whilst the general scan continues in case of multiple attackers.

Once the approaching target is picked up by the present invention the optical detector module as known in the art (not shown) feeds the appropriate signals to the central computer (not shown). The central computer then determines the requisite firing rate and firing pattern of the large array of laser pulse amplifiers 9 which can take the form of semi-conductor lasers. The phased array of optical transmitters formed by the ends of the optical fibres forming end face 7, then transmits an increasingly converging beam onto the said target whilst monitoring the environment for additional attackers.

When the attacker becomes within range of the focussed beam mode the computer initiates the destruct mode by focussing the laser beam output from end face 7 onto the target.

In the case of a high velocity attacker which is difficult to destroy, the destruct mode may consist of a sequence of maximum power shots. If the target is still not destroyed the apparatus of the invention can be constructed in such a manner that the whole of end face 7 can be tracked mechanically to follow the attacker both in azimuth and elevation through 360° and 180° respectively. Alternatively, end face 7 can be positioned in a horizontal plane.

The invention can be used to defend cities, ships, aircraft, tanks and spaceships.

Another application of the invention can be realised by placing of nuclear fusion pellets in the common focus region of an array of two or more systems of the invention, the said pellets can then be irradiated and thus compressed to high densities exceeding 100 grams $cm^{-3}$ to achieve the threshold of thermonuclear fusion.

Computation of the peak power output of the invention may be estimated in terms of between $10^9$ and $10^{10}$ watts $cm^{-2}$ on end face 7. If end face 7 is 10 meters in diameter then the peak output power could exceed $10^{15}$ watts, equivalent to an input provided by one million ($10^6$) semi-conductor laser packs each one emitting a pulse of 1 joule over $10^{-9}$ seconds (one nanosecond). Lasers of other power and timing characteristics may be employed in the alternative, such as neodynium yag lasers. A transmitted pulse of several megajoules is adequate to deactivate most high velocity targets over a distance of several kilometers. Obviously the problem with slower targets is simplified.

It should be noted that the source of laser radiation may be a single laser oscillator. On the other hand, such a master oscillator may be dispensed with if all the amplifiers could be fixed to produce what would essentially be a coherent output with respect to each other. Bearing in mind that switching delays in the picosecond ($10^{-12}$ seconds) regime are involved, and that conventional thermal sources are relatively coherent on the nanosecond scale, for example the first holograms were produced with thermal light sources, it is envisaged that extremely fast switching of laser sources on the picosecond ($10^{-12}$ second) could produce a usable degree of coherence in this invention which would allow the master laser oscillator to be dispensed with.

It is reiterated that the foregoing description with respect to the drawings is exemplary only and it is intended that the description be given a broad connotation.

I claim:

1. A variable beam laser radar system capable of operating in diverging, parallel and converging beam modes, comprising: at least one optical transmitter having individual fibres in a fibre bundle, said transmitter including an output aperture composed of a close packed, coherent array of single mode fibres having optically polished fibre ends forming a substantially planar face, the other optically polished ends of individual fibres of said fibre bundle being loose and each such one of said individual fibres being connected to a single mode laser source in an array of such sources, the laser sources being activated such that the laser emission from the individual fibres forming the transmitter output aperture is phase-locked at said face of said output aperture, allowing for both output beam scanning and output beam focussing.

2. A variable beam laser radar system as claimed in claim 1 wherein the optically polished fibre ends forming the output aperture are arranged in concentric rows of fibres in a phased-array so that the output beam from the transmitter aperture may be focussed as a single mode beam along a central axis through the surface of the aperture at a distance depending on the time delay between the radiation emitted from consecutive concentric rows of fibres.

3. A variable beam laser radar system as claimed in claim 1 where the loose end of each fiber is optically connected to a single laser amplifier which in turn is optically connected to a master laser oscillator which provides the laser signal for each of the said laser amplifiers.

4. A variable beam laser radar system as claimed in claim 3 where the signal from the master laser oscillator is amplified within each suitably doped optical fibre.

5. A variable beam laser system as claimed in claim 1 where the firing of the laser sources is activated as an array in a set pattern using a computer.

6. A laser radar system as claimed in claim 1 where the diameter of the output aperture is 10 meters giving an output power of $10^{15}$ watts peak with an energy loading of 1 joule for $10^{-9}$ seconds.

7. A laser radar system as claimed in claim 1 where the output aperture is positioned horizontally.

8. A laser radar system as claimed in claim 1 where the output aperture is mountable on a trackable frame so that it can be moved in both azimuth and elevation.

9. A laser radar system as claimed in claim 1 where the laser oscillator and laser amplifier are semiconductor lasers.

10. A laser radar system as claimed in claim 1 where the laser oscillator and laser amplifier are neodymium yag lasers.

* * * * *